(12) United States Patent
Berkowitz et al.

(10) Patent No.: US 11,325,246 B2
(45) Date of Patent: *May 10, 2022

(54) GROUNDED SEA ACTUATOR

(71) Applicant: X Development LLC, Mountain View, CA (US)

(72) Inventors: Ben Berkowitz, Mountain View, CA (US); Seth Gilbertson, Mountain View, CA (US); Marc Strauss, Fremont, CA (US)

(73) Assignee: X Development LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/119,353

(22) Filed: Dec. 11, 2020

(65) Prior Publication Data

US 2021/0114201 A1    Apr. 22, 2021

Related U.S. Application Data

(60) Continuation of application No. 16/553,480, filed on Aug. 28, 2019, now Pat. No. 10,906,174, which is a division of application No. 15/334,231, filed on Oct. 25, 2016, now Pat. No. 10,434,643.

(51) Int. Cl.
| | |
|---|---|
| *G01L 1/04* | (2006.01) |
| *B25J 9/10* | (2006.01) |
| *F16H 19/02* | (2006.01) |
| *B25J 13/08* | (2006.01) |

(52) U.S. Cl.
CPC ......... *B25J 9/1035* (2013.01); *B25J 13/085* (2013.01); *F16H 19/02* (2013.01); *Y10S 901/25* (2013.01)

(58) Field of Classification Search
CPC ........ B25J 9/1035; B25J 13/085; B25J 9/102; F16H 19/02; F16H 1/16; Y10S 901/25
See application file for complete search history.

(56) References Cited

U.S. PATENT DOCUMENTS

| | | | | |
|---|---|---|---|---|
| 5,680,916 A | * | 10/1997 | Borschert | ............. F16D 29/005 192/20 |
| 10,081,102 B1 | * | 9/2018 | Berkowitz | ............. F16H 57/12 |
| 2007/0282228 A1 | * | 12/2007 | Einav | ............... A63B 21/00178 601/33 |
| 2008/0190988 A1 | * | 8/2008 | Pedicini | ................... B25C 1/04 227/130 |
| 2009/0312870 A1 | | 12/2009 | Okuda et al. | |

(Continued)

*Primary Examiner* — Muhammad S Islam
(74) *Attorney, Agent, or Firm* — McDonnell Boehnen Hulbert & Berghoff LLP

(57) ABSTRACT

A device is provided. The device includes a worm drive comprising a worm and a worm gear. The device also includes an actuator comprising a motor, a shaft, and the worm, wherein the shaft is configured to rotate about a shaft axis, and the actuator is configured to (i) drive the worm drive, and (ii) move linearly along the shaft axis. The device also includes a first spring and a second spring, wherein the second ends are fixed, and wherein the first and second springs are configured to resist movement of the actuator along the shaft axis in opposite directions as a result of forces transmitted through the worm drive. The device further includes a linear position encoder configured to determine a position of the actuator along the shaft axis.

20 Claims, 9 Drawing Sheets

(56) References Cited

U.S. PATENT DOCUMENTS

2010/0101346 A1* 4/2010 Johnson ............... B25J 13/088
  74/405
2015/0300479 A1* 10/2015 Frank ................... F16H 57/039
  324/207.2

* cited by examiner

GROUNDED SEA ACTUATOR

CROSS REFERENCE TO RELATED DISCLOSURE

This application is continuation of U.S. application Ser. No. 16/553,480 filed on Aug. 28, 2019, which is a divisional of U.S. patent application Ser. No. 15/334,231 filed on Oct. 25, 2016. U.S. application Ser. Nos. 16/553,480 and 15/334,231 are incorporated herein by reference in their entirety.

BACKGROUND

As technology advances, various types of robotic devices are being created for performing a variety of functions that may assist users. Robotic devices may be used for applications involving material handling, transportation, welding, assembly, and dispensing, among others. Over time, the manner in which these robotic systems operate is becoming more intelligent, efficient, and intuitive. As robotic systems become increasingly prevalent in numerous aspects of modern life, it is desirable for robotic systems to be both efficient and safe. Therefore, demand for efficient and safe robotic systems has helped spur innovation in actuation, movement, sensing techniques, and component design and assembly.

Robotic devices, such as robotic legs and arms, may include joints between various members, as well as various components that are designed to interact with the environment. Such components may include robotic feet and hands, which may include additional components that can be used to support, stabilize, grip, and otherwise allow a robotic device to effectively carry out one or more actions.

SUMMARY

The present application discloses implementations that relate to measuring forces acting on bidirectional force systems. A robotic appendage may include two members connected at a joint, such that the joint has a single degree of freedom. It may be beneficial to measure forces acting on the members and/or joint to ensure compliance, as well as ensure the robotic appendage is safe in its interaction with the environment while minimizing the risk of damage to both the environment and the robotic appendage itself.

During use of a robotic appendage, an actuator may activate and attempt to cause the members of the appendage to rotate with respect to each other. Various forces may act on the members, and may either prevent the rotation of the members or cause the members to rotate further than expected. The magnitude and direction of these forces may be useful in determining compliance and safety metrics related to the robotic appendage.

In one example, the present application describes a device. The device includes a worm drive comprising a worm and a worm gear. The device also includes an actuator comprising a motor, a shaft, and the worm, wherein the shaft is configured to rotate about a shaft axis, and wherein the actuator is configured to (i) drive the worm drive, and (ii) move linearly along the shaft axis. The device further includes a first spring having a first end and a second end, wherein the second end is fixed, and wherein the first spring is configured to resist movement of the actuator along the shaft axis in a first direction as a result of a first force transmitted through the worm drive. The device yet further includes a second spring having a first end and a second end, wherein the second end is fixed, and wherein the second spring is configured to resist movement of the actuator along the shaft axis in a second direction as a result of a second force transmitted through the worm drive, wherein the second direction is opposite the first direction. And the device still further includes a linear position encoder configured to determine a position of the actuator along the shaft axis.

In a second example, a method is described. The method involves determining, by a linear position encoder, a first linear position of an actuator that drives a worm drive, wherein (i) the worm drive comprises a worm and a worm gear, (ii) the actuator comprises a motor, shaft, and the worm, wherein the shaft is configured to rotate about a shaft axis and the actuator is configured to move linearly along a shaft axis, (iii) a first spring has a first end and a second end, wherein the second end is fixed, and wherein the first spring is configured to resist movement of the actuator along the shaft axis in a first direction as a result of a first force transmitted through the worm drive, and (iv) a second spring has a first end and a second end, wherein the second end is fixed, and wherein the second spring is configured to resist movement of the actuator along the shaft axis in a second direction as a result of a second force transmitted through the worm drive, wherein the second direction is opposite the first direction. The method also involves determining, by the linear position encoder, a second linear position of the actuator, wherein the second linear position is different than the first linear position. The method yet further involves determining a force acting on the actuator along the shaft axis based on a difference between the first linear position and the second linear position. The method still further involves controlling the actuator based on the determined force.

In a third example, a robotic device is described. The robotic device includes a worm drive comprising a worm and a worm gear. The robotic device also includes an actuator comprising a motor, a shaft, and the worm, wherein the shaft is configured to rotate about a shaft axis, and wherein the actuator is configured to (i) drive the worm drive, and (ii) move linearly along the shaft axis. The robotic device further includes a first spring having a first end and a second end, wherein the second end is fixed, and wherein the first spring is configured to resist movement of the actuator along the shaft axis in a first direction as a result of a first force transmitted through the worm drive. The robotic device still further includes a second spring having a first end and a second end, wherein the second end is fixed, and wherein the second spring is configured to resist movement of the actuator along the shaft axis in a second direction as a result of a second force transmitted through the worm drive, wherein the second direction is opposite the first direction. The robotic device yet further includes a linear position encoder configured to determine a position of the actuator along the shaft axis. The robotic device still further includes a control system, wherein the control system comprises a processor, a non-transitory computer-readable memory, program instructions stored on the non-transitory computer-readable memory and executable by the processor. The program instructions are executable to (i) receive, from the linear position encoder, the position of the actuator along the shaft axis, (ii) determine, based on the position of the actuator, a force acting on the actuator along the shaft axis, and (iii) control the actuator based on the determined force.

In another example, a control system is described. The control system includes means for determining a first linear position of an actuator that drives a worm drive, wherein (i) the worm drive comprises a worm and a worm gear, (ii) the actuator comprises a motor, shaft, and the worm, wherein the shaft is configured to rotate about a shaft axis and the actuator is configured to move linearly along a shaft axis, (iii) a first spring has a first end and a second end, wherein the second end is fixed, and wherein the first spring is configured to resist movement of the actuator along the shaft axis in a first direction as a result of a first force transmitted through the worm drive, and (iv) a second spring has a first end and a second end, wherein the second end is fixed, and wherein the second spring is configured to resist movement of the actuator along the shaft axis in a second direction as a result of a second force transmitted through the worm drive, wherein the second direction is opposite the first direction. The control system also includes means for determining a second linear position of the actuator, wherein the second linear position is different than the first linear position. The control system further includes means for determining a force acting on the actuator along the shaft axis based on a difference between the first linear position and the second linear position. The control system still further includes means for controlling the actuator based on the determined force.

The foregoing summary is illustrative only and is not intended to be in any way limiting. In addition to the illustrative aspects, embodiments, and features described above, further aspects, embodiments, and features will become apparent by reference to the figures and the following detailed description and the accompanying drawings.

DETAILED DESCRIPTION

Figure 1:
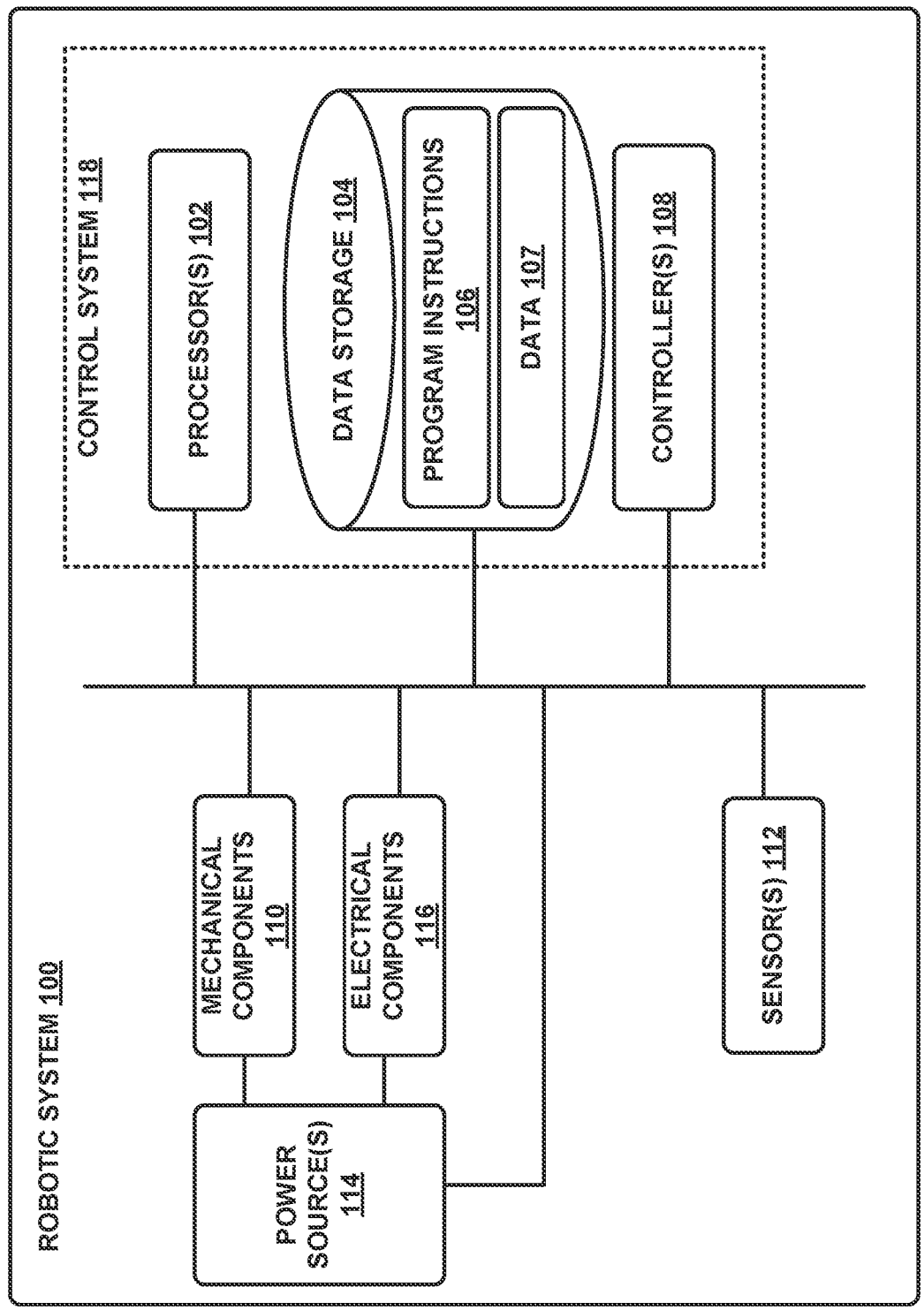
FIG. 1 illustrates a configuration of a robotic system, according to an example implementation.

The following detailed description describes various features and functions of the disclosed devices, systems, and methods with reference to the accompanying figures. The illustrative device, system, and method embodiments described herein are not meant to be limiting. It should be understood that the words "exemplary," "example," and "illustrative," are used herein to mean "serving as an example, instance, or illustration." Any implementation, embodiment, or feature described herein as "exemplary," "example," or "illustrative," is not necessarily to be construed as preferred or advantageous over other implementations, embodiments, or features. Further, the implementations and embodiments described herein are not meant to be limiting. It will be readily understood that certain aspects of the disclosed devices, systems, and methods can be arranged and combined in a wide variety of different configurations, all of which are contemplated herein. Additionally, the following detailed description describes various features and functions of the disclosure with reference to the accompanying Figures. In the Figures, similar symbols typically identify similar components, unless context dictates otherwise.

I. Overview

Robotic joints may be used in many situations to allow a robotic device to interact with an environment, through movement of the robotic device and positioning of various components of the robotic device such as arms, legs, and end effectors. During use of the robotic device, one or more components may impact the environment, causing unexpected forces to act on the components. For instance, a robotic device may include an arm with a joint, having a gripper attached to the end of the arm. The robotic device may control the arm, intending to position the gripper over and object to pick it up. However, the arm may unintentionally impact an object in the environment, such as a wall, which may impart a force on the arm that was not expected. It may be beneficial to have a mechanism for determining this force, so that proper action can be taken to avoid damage to the environment and/or the robotic device.

In the field of robotics, the control system of a robotic device may operate more effectively when provided with information regarding the position, orientation, and forces acting on each component of the robotic device. To provide this information, different types of sensors may be placed on or included in one or more components. However, increasing the number of sensors also means increasing the complexity of the system, as well as increasing the number of possible points of failure.

With these concepts in mind, an example device disclosed herein may include a worm drive, and actuator, a first spring and a second spring, and a linear position encoder. The worm drive may comprise a worm and a worm gear. The actuator may comprise a motor, a shaft, and the worm of the worm drive, such that the motor turns the shaft, which turns the worm, which then turns the worm gear. Alternatively, the worm gear may be turned, thereby imparting a force on the worm, which may cause the worm, shaft, and actuator to slide along an axis. The first spring may be coupled to the actuator on one end, and fixed on the other end, such that the first spring resists movement of the actuator in a first direction. The second spring may similarly be coupled to the actuator on one end, and fixed on the other end. The second spring may be configured such that is resists movement of the actuator in a second direction opposite the first direction. The linear position encoder may be configured to determine the position of the actuator along an axis about which the shaft of the actuator rotates (i.e., the shaft axis).

Example embodiments of a device disclosed herein may include a first spring and second spring that are compression springs, extension springs, or other types of springs. Further, characteristics of the first spring and second spring may be the same or different from each other, such as different types, sizes, shapes, and spring constants. In some examples, each of the first spring and/or second spring may be made up of two or more springs. Also, one or more springs may partially surround the actuator, and/or may be in various positions around the actuator. In some examples, the first and second spring may be a single spring configured to resist movement in two directions, such that the single spring compresses, thereby resisting movement in a first direction, and extends, thereby resisting movement in the opposite direction.

The following two examples help illustrate some concepts related to determining a difference in position of the actuator due to a force transmitted through the worm drive. Both examples are described with reference to an elbow joint of a robotic arm, however the same principles can be applied in other contexts. In a first example, the actuator may actuate, causing the shaft (and worm) to rotate. The worm gear, however, may be held stationary due to an object in the environment preventing the elbow joint from opening or closing. When the actuator actuates, the worm may attempt to rotate the worm gear, however the worm may instead rotate against the worm gear and move itself backwards, causing the actuator to slide along the shaft axis. The difference in position of the actuator may be correlated to the force holding the worm gear stationary via the known parameters of the mechanism components.

In another example, the actuator may not actuate. Instead, a force may act on the elbow joint attempting to open or close the joint. The force may be transmitted through the joint, causing the worm gear to rotate. The worm, however, may not rotate, but may instead slide perpendicularly, along the actuator shaft axis. This may slide the actuator to a new position. The difference in position may be correlated to the force imparted on the worm gear, or a torque acting on the elbow joint.

The first and second springs may hold the actuator in an equilibrium position. When a force acts on the elbow joint from an object in the environment, or the actuator rotates the worm against the worm gear, the actuator may move. This may cause the springs to compress and/or extend.

II. Example Robotic Systems

FIG. 1 illustrates an example configuration of a robotic system that may be used in connection with the implementations described herein. The robotic system 100 may be configured to operate autonomously, semi-autonomously, and/or using directions provided by user(s). The robotic system 100 may be implemented in various forms, such as a robotic arm, industrial robot, or some other arrangement. Furthermore, the robotic system 100 may also be referred to as a robot, robotic device, or mobile robot, among other designations.

As shown in FIG. 1, the robotic system 100 may include processor(s) 102, data storage 104, and controller(s) 108, which together may be part of a control system 118. The robotic system 100 may also include sensor(s) 112, power source(s) 114, mechanical components 110, and electrical components 116. Nonetheless, the robotic system 100 is shown for illustrative purposes, and may include more or fewer components. The various components of robotic system 100 may be connected in any manner, including wired or wireless connections. Further, in some examples, components of the robotic system 100 may be distributed among multiple physical entities rather than a single physical entity. Other example illustrations of robotic system 100 may exist as well.

Processor(s) 102 may operate as one or more general-purpose hardware processors or special purpose hardware processors (e.g., digital signal processors, application specific integrated circuits, etc.). The processor(s) 102 may be configured to execute computer-readable program instructions 106, and manipulate data 107, both of which are stored in the data storage 104. The processor(s) 102 may also directly or indirectly interact with other components of the robotic system 100, such as sensor(s) 112, power source(s) 114, mechanical components 110, and/or electrical components 116.

The data storage 104 may be one or more types of hardware memory. For example, the data storage 104 may include or take the form of one or more computer-readable storage media that can be read or accessed by processor(s) 102. The one or more computer-readable storage media can include volatile and/or non-volatile storage components, such as optical, magnetic, organic, or another type of memory or storage, which can be integrated in whole or in part with processor(s) 102. In some implementations, the data storage 104 can be a single physical device. In other implementations, the data storage 104 can be implemented using two or more physical devices, which may communicate with one another via wired or wireless communication. As noted previously, the data storage 104 may include the computer-readable program instructions 106 and the data 107. The data 107 may be any type of data, such as configuration data, sensor data, and/or diagnostic data, among other possibilities.

The controller 108 may include one or more electrical circuits, units of digital logic, computer chips, and/or microprocessors that are configured to (perhaps among other tasks), interface between any combination of the mechanical components 110, the sensor(s) 112, the power source(s) 114, the electrical components 116, the control system 118, and/or a user of the robotic system 100. In some implementations, the controller 108 may be a purpose-built embedded device for performing specific operations with one or more subsystems of the robotic device 100.

The control system 118 may monitor and physically change the operating conditions of the robotic system 100. In doing so, the control system 118 may serve as a link between portions of the robotic system 100, such as between mechanical components 110 and/or electrical components 116. In some instances, the control system 118 may serve as an interface between the robotic system 100 and another computing device. Further, the control system 118 may serve as an interface between the robotic system 100 and a user. In some instances, the control system 118 may include various components for communicating with the robotic system 100, including a joystick, buttons, and/or ports, etc. The example interfaces and communications noted above may be implemented via a wired or wireless connection, or both. The control system 118 may perform other operations for the robotic system 100 as well.

During operation, the control system 118 may communicate with other systems of the robotic system 100 via wired or wireless connections, and may further be configured to communicate with one or more users of the robot. As one possible illustration, the control system 118 may receive an input (e.g., from a user or from another robot) indicating an instruction to perform a particular gait in a particular direction, and at a particular speed. A gait is a pattern of movement of the limbs of an animal, robot, or other mechanical structure.

Based on this input, the control system 118 may perform operations to cause the robotic device 100 to move according to the requested gait. As another illustration, a control system may receive an input indicating an instruction to move to a particular geographical location. In response, the control system 118 (perhaps with the assistance of other components or systems) may determine a direction, speed, and/or gait based on the environment through which the robotic system 100 is moving en route to the geographical location.

Operations of the control system 118 may be carried out by the processor(s) 102. Alternatively, these operations may be carried out by the controller 108, or a combination of the processor(s) 102 and the controller 108. In some implementations, the control system 118 may partially or wholly reside on a device other than the robotic system 100, and therefore may at least in part control the robotic system 100 remotely.

Mechanical components 110 represent hardware of the robotic system 100 that may enable the robotic system 100 to perform physical operations. As a few examples, the robotic system 100 may include physical members such as leg(s), arm(s), wheel(s), hand(s), finger(s), feet, and/or end effectors. The physical members or other parts of robotic system 100 may further include actuators arranged to move the physical members in relation to one another. The robotic system 100 may also include one or more structured bodies for housing the control system 118 and/or other components, and may further include other types of mechanical components. The particular mechanical components 110 used in a given robot may vary based on the design of the robot, and may also be based on the operations and/or tasks the robot may be configured to perform.

In some examples, the mechanical components 110 may include one or more removable components. The robotic system 100 may be configured to add and/or remove such removable components, which may involve assistance from a user and/or another robot. For example, the robotic system 100 may be configured with removable arms, hands, feet, and/or legs, so that these appendages can be replaced or changed as needed or desired. In some implementations, the robotic system 100 may include one or more removable and/or replaceable battery units or sensors. Other types of removable components may be included within some implementations.

The robotic system 100 may include sensor(s) 112 arranged to sense aspects of the robotic system 100. The sensor(s) 112 may include one or more force sensors, torque sensors, velocity sensors, acceleration sensors, position sensors, proximity sensors, motion sensors, location sensors, load sensors, temperature sensors, touch sensors, depth sensors, ultrasonic range sensors, infrared sensors, object sensors, and/or cameras, among other possibilities. Within some examples, the robotic system 100 may be configured to receive sensor data from sensors that are physically separated from the robot (e.g., sensors that are positioned on other robots or located within the environment in which the robot is operating).

The sensor(s) 112 may provide sensor data to the processor(s) 102 (perhaps by way of data 107) to allow for interaction of the robotic system 100 with its environment, as well as monitoring of the operation of the robotic system 100. The sensor data may be used in evaluation of various factors for activation, movement, and deactivation of mechanical components 110 and electrical components 116 by control system 118. For example, the sensor(s) 112 may capture data corresponding to the terrain of the environment or location of nearby objects, which may assist with environment recognition and navigation. In an example configuration, sensor(s) 112 may include RADAR (e.g., for long-range object detection, distance determination, and/or speed determination), LIDAR (e.g., for short-range object detection, distance determination, and/or speed determination), SONAR (e.g., for underwater object detection, distance determination, and/or speed determination), VICON® (e.g., for motion capture), one or more cameras (e.g., stereoscopic cameras for 3D vision), a global positioning system (GPS) transceiver, and/or other sensors for capturing information of the environment in which the robotic system 100 is operating. The sensor(s) 112 may monitor the environment in real time, and detect obstacles, elements of the terrain, weather conditions, temperature, and/or other aspects of the environment. In another example, sensor(s) 112 may capture data corresponding to one or more characteristics of a target or identified object, such as a size, shape, profile, structure, or orientation of the object.

Further, the robotic system 100 may include sensor(s) 112 configured to receive information indicative of the state of the robotic system 100, including sensor(s) 112 that may monitor the state of the various components of the robotic system 100. The sensor(s) 112 may measure activity of systems of the robotic system 100 and receive information based on the operation of the various features of the robotic system 100, such as the operation of extendable legs, arms, or other mechanical and/or electrical features of the robotic system 100. The data provided by the sensor(s) 112 may enable the control system 118 to determine errors in operation as well as monitor overall operation of components of the robotic system 100.

As an example, the robotic system 100 may use force sensors to measure load on various components of the robotic system 100. In some implementations, the robotic system 100 may include one or more force sensors on an arm, leg, hand, foot, or finger to measure the load on the actuators that move one or more members of the arm, leg, hand, foot, or finger. As another example, the robotic system 100 may use one or more position sensors to sense the position of the actuators of the robotic system. For instance, such position sensors may sense states of extension, retraction, positioning, or rotation of the actuators on arms, legs, hands, feet, fingers, or end effectors.

As another example, the sensor(s) 112 may include one or more velocity and/or acceleration sensors. For instance, the sensor(s) 112 may include an inertial measurement unit (IMU). The IMU may sense velocity and acceleration in the world frame, with respect to the gravity vector. The velocity and acceleration sensed by the IMU may then be translated to that of the robotic system 100 based on the location of the IMU in the robotic system 100 and the kinematics of the robotic system 100.

The robotic system 100 may include other types of sensors not explicitly discussed herein. Additionally or alternatively, the robotic system may use particular sensors for purposes not enumerated herein.

The robotic system 100 may also include one or more power source(s) 114 configured to supply power to various components of the robotic system 100. Among other possible power systems, the robotic system 100 may include a hydraulic system, electrical system, batteries, and/or other types of power systems. As an example illustration, the robotic system 100 may include one or more batteries configured to provide charge to components of the robotic system 100. Some of the mechanical components 110 and/or electrical components 116 may each connect to a different power source, may be powered by the same power source, or be powered by multiple power sources.

Any type of power source may be used to power the robotic system 100, such as electrical power or a gasoline engine. Additionally or alternatively, the robotic system 100 may include a hydraulic system configured to provide power to the mechanical components 110 using fluid power. Components of the robotic system 100 may operate based on hydraulic fluid being transmitted throughout the hydraulic system to various hydraulic motors and hydraulic cylinders, for example. The hydraulic system may transfer hydraulic power by way of pressurized hydraulic fluid through tubes, flexible hoses, or other links between components of the robotic system 100. The power source(s) 114 may charge using various types of charging, such as wired connections to an outside power source, wireless charging, combustion, or other examples.

The electrical components 116 may include various mechanisms capable of processing, transferring, and/or providing electrical charge or electric signals. Among possible examples, the electrical components 116 may include electrical wires, circuitry, and/or wireless communication transmitters and receivers to enable operations of the robotic system 100. The electrical components 116 may interwork with the mechanical components 110 to enable the robotic system 100 to perform various operations. The electrical components 116 may be configured to provide power from the power source(s) 114 to the various mechanical components 110, for example. Further, the robotic system 100 may include electric motors. Other examples of electrical components 116 may exist as well.

Although not shown in FIG. 1, the robotic system 100 may include a body, which may connect to or house appendages and components of the robotic system. As such, the structure of the body may vary within examples and may further depend on particular operations that a given robot may have been designed to perform. For example, a robot developed to carry heavy loads may have a wide body that enables placement of the load. Similarly, a robot designed to reach high speeds may have a narrow, small body that does not have substantial weight. Further, the body and/or the other components may be developed using various types of materials, such as metals or plastics. Within other examples, a robot may have a body with a different structure or made of various types of materials.

The body and/or the other components may include or carry the sensor(s) 112. These sensors may be positioned in various locations on the robotic device 100, such as on the body and/or on one or more of the appendages, among other examples.

On its body, the robotic device 100 may carry a load, such as a type of cargo that is to be transported. The load may also represent external batteries or other types of power sources (e.g., solar panels) that the robotic device 100 may utilize. Carrying the load represents one example use for which the robotic device 100 may be configured, but the robotic device 100 may be configured to perform other operations as well.

As noted above, the robotic system 100 may include various types of legs, arms, wheels, end effectors, gripping devices and so on. In general, the robotic system 100 may be configured with zero or more legs. An implementation of the robotic system with zero legs may include wheels, treads, or some other form of locomotion. An implementation of the robotic system with two legs may be referred to as a biped, and an implementation with four legs may be referred as a quadruped. Implementations with six or eight legs are also possible. For purposes of illustration, robotic arm implementations of the robotic system 100 are described below.

Figure 2:
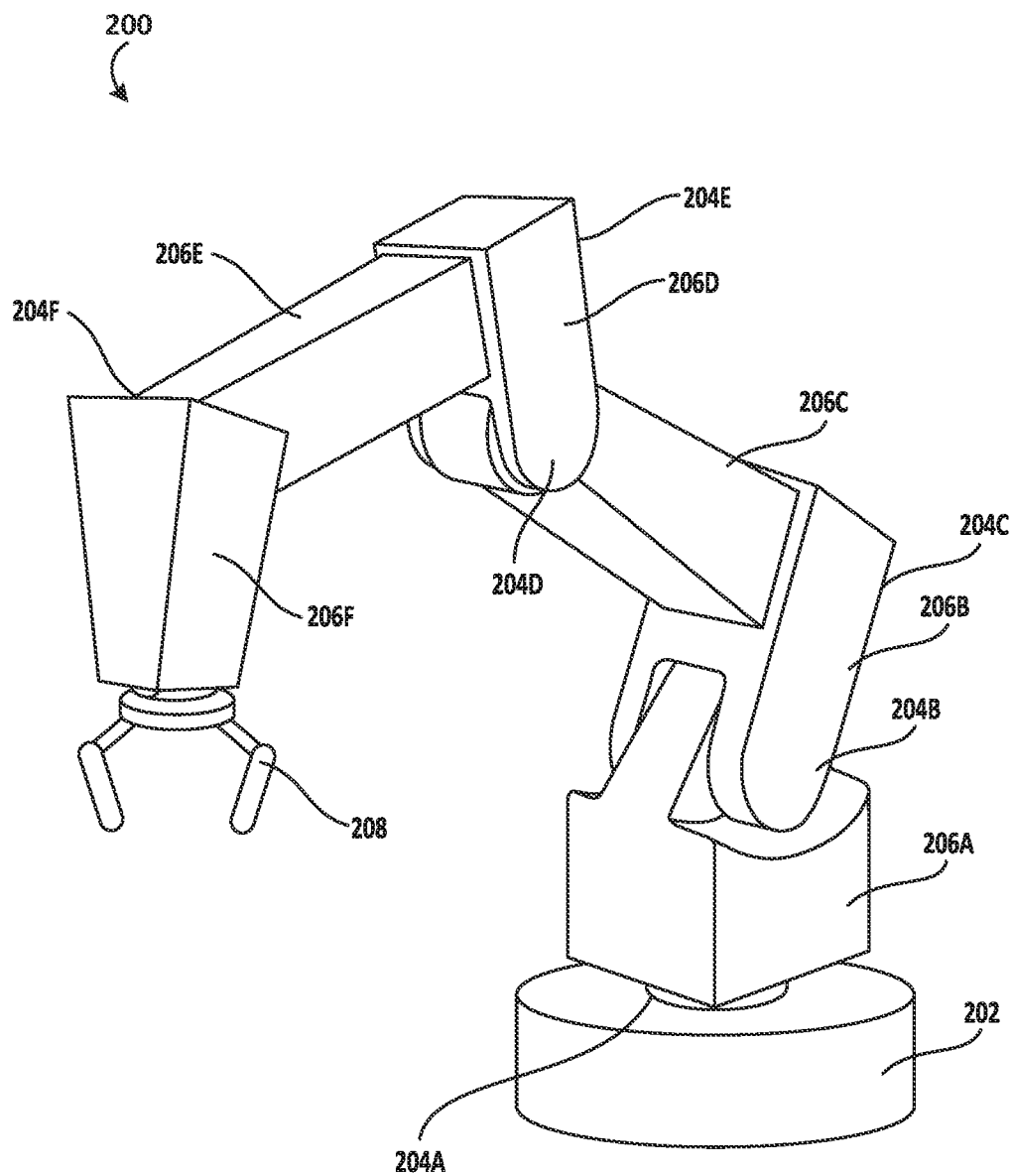
FIG. 2 illustrates an example robotic arm, according to an example implementation.

FIG. 2 shows an example robotic arm 200. As shown, the robotic arm 200 includes a base 202, which may be a stationary base or may be a movable base. In the case of a movable base, the base 202 may be considered as one of the mechanical components 110 and may include wheels (not shown), powered by one or more of actuators, which allow for mobility of the entire robotic arm 200.

Additionally, the robotic arm 200 includes joints 204A-204F each coupled to one or more actuators. Each joint may be coupled to a worm drive and/or actuator, described in more detail below. The actuators in joints 204A-204F may operate to cause movement of various mechanical components 110 such as appendages 206A-206F and/or end effector 208. For example, the actuator in joint 204F may cause movement of appendage 206F and end effector 208 (i.e., since end effector 208 is coupled to appendage 206F). Further, end effector 208 may take on various forms and may include various parts. In one example, end effector 208 may take the form of a gripper such as a finger gripper as shown here or a different type of gripper such as a suction gripper. In another example, end effector 208 may take the form of a tool such as a drill or a brush. In yet another example, the end effector may include sensors such as force sensors, location sensors, and/or proximity sensors. Other examples may also be possible.

In an example implementation, a robotic system 100, such as robotic arm 200, may be capable of operating in a teach mode. In particular, teach mode may be an operating mode of the robotic arm 200 that allows a user to physically interact with and guide the robotic arm 200 towards carrying out and recording various movements. In a teaching mode, an external force is applied (e.g., by the user) to the robotic system 100 based on a teaching input that is intended to teach the robotic system regarding how to carry out a specific task. The robotic arm 200 may thus obtain data regarding how to carry out the specific task based on instructions and guidance from the user. Such data may relate to a plurality of configurations of the mechanical components 110, joint position data, velocity data, acceleration data, torque data, force data, and power data, among other possibilities.

For example, during teach mode the user may grasp onto any part of the robotic arm 200 and provide an external force by physically moving the robotic arm 200. In particular, the user may guide the robotic arm 200 towards grasping onto an object and then moving the object from a first location to a second location. As the user guides the robotic arm 200 during teach mode, the system may obtain and record data related to the movement such that the robotic arm 200 may be configured to independently carry out the task at a future time during independent operation (e.g., when the robotic arm 200 operates independently outside of teach mode). Note, however, that external forces may also be applied by other entities in the physical workspace such as by other objects, machines, and/or robotic systems, among other possibilities.

III. Example Device

Figure 3A:
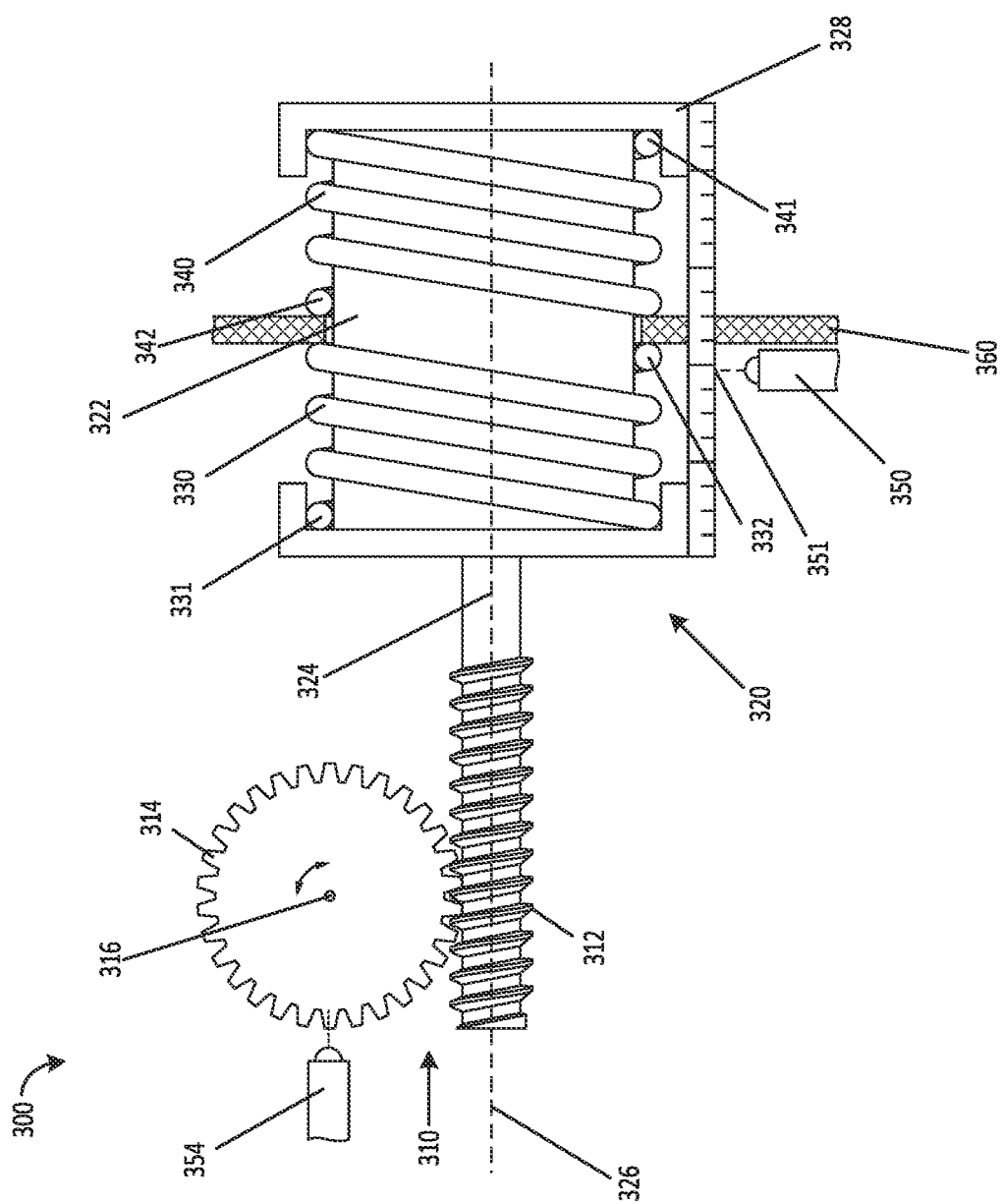
FIG. 3A illustrates a first configuration of a device in an initial state, according to an example implementation.

As noted above, the present disclosure includes implementations that relate to measuring forces and/or torques acting on bidirectional actuation mechanisms. In one example, the present disclosure may relate to measuring forces/torques acting on a joint of a robotic device. These forces/torques may be reflected in and correspond to movement of an actuator along an axis. FIG. 3A illustrates a simplified example of a first embodiment of the present disclosure in an initial state. In FIG. 3A, device 300 may include a worm drive 310 comprising a worm 312 and a worm gear 314. Device 300 may also include an actuator 320 comprising a motor 322, a shaft 324, and the worm 312.

Shaft 324 may be coupled to worm 312 such that rotation of one causes rotation of the other.

Device 300 may also include a first spring 330 and a second spring 340, which may be in contact with actuator 320 such that actuator 320 can slide along axis 326 and can compress and/or extend springs 330 and 340. Device 300 may further include linear position encoder 350, and rotational position encoder 354.

Device 300 may be implemented as a mechanical component of system 100 and/or a robotic device, such as robotic arm 200. In some examples, multiple devices similar or identical to device 300 may be included in a robotic arm, with one device for each joint. Although the components illustrated in FIG. 3A are shown with a certain orientation and/or design, it should be understood that one or more components of device 300 may be removed, added, and/or modified while remaining within the scope of this disclosure. Also, the orientation and combination of components may be changed based on the desired implementation.

Device 300 may include one or more physical components, such as those shown in FIG. 3A, including a worm drive 310, actuator 320, and springs 330 and 340. In some examples, device 300 may include more or fewer physical components than those shown, such as additional gearing stages and intermediate components that may connect one or more of those shown in FIG. 3A. In particular, various arrangements of the first spring 330 and second spring 340 may be used, and are described in further detail with respect to FIGS. 4A-B and 5A-B. Further, for purposes of explanation and simplicity, examples disclosed herein may be described with reference to device 300 being connected to an elbow joint of a robotic arm. However it should be understood that other joints and robotic components may be used within the scope of this disclosure. For instance, in some examples, worm gear 314 may be connected to an arm, leg, wheel, end effector, or other component of a robotic device that may be configured to move. A robotic arm connected to worm gear 314 may be configured to contact, grasp, hold, grip, or otherwise interact with an object in the environment. In this disclosure, movement of the arm or other component may refer to rotation about one or more axes (i.e., opening or closing at the elbow). However, the principles described herein should be understood to apply to any suitable robotic joint or component having a degree of freedom. For instance, worm gear 314 may also be connected to a component that moves translationally along an axis, such as movement in a clamping or sliding manner.

In FIG. 3A, worm drive 310 may include worm 312 and worm gear 314. In some examples, worm gear 314 may be connected directly to a joint of a robotic device (such as an elbow). In other examples, worm gear 314 may be coupled to a joint of a robotic device through one or more other gears, gear stages, belts, and/or other components. As used herein, a first component "coupled" or "connected" to a second component means that the two components may be directly connected to each other, or may have one or more components, gears, shafts, or connecting elements placed between them.

Worm gear 314 may be a circular worm gear or worm wheel, having teeth facing outward surrounding an inner wheel. In some examples, the shape of worm gear 314 may be a partial circle, ellipse, or other shape. Further, the shape of worm gear 314 may either be symmetric or asymmetric, full or partial, and/or may be shape other than a circle. Worm gear 314 may be coupled to a robotic joint (not shown) such that rotation of worm gear 314 causes the robotic joint to actuate. And further, worm gear 314 may be coupled such that movement of the robotic joint causes the worm gear to rotate (i.e., worm gear 314 and the robotic joint can drive each other). In some examples, the teeth of worm gear 314 may be curved and/or angled to provide a smoother coupling to worm 312. This may result in smoother operation of the robotic gripping device.

In some examples, worm gear 314 may be fixed with respect to a component of the robotic device it is connected to. For instance, device 300 may be located inside an arm of a robotic device. Worm gear 314 may be configured to rotate around a central point 316, and that central point 316 may be fixed relative to the arm of the robotic device. In FIG. 3A, plate 360 may be a component of the robotic arm, and as such central point 316 may be fixed relative to plate 360.

In some examples, worm 312 and worm gear 314 may have a high reduction ratio. Where there is a high reduction ratio, one full rotation of worm 312 may correspond to 1/32 of a full rotation (or some other small amount) of worm gear 314. The reduction ratio may depend on the number and spacing of the teeth of worm gear 314 and worm 312. A characteristic of the high reduction ratio is that the worm is not back-drivable. As such, a force rotating worm 312 may cause worm gear 314 to responsively rotate, but a force rotating the worm gear 314 may not cause the worm 312 to responsively rotate.

Device 300 may also include an actuator 320. Actuator 320 may include a motor 322, a shaft 324, and the worm 312. When the actuator is turned on, engaged, or otherwise activated, motor 322 may rotate shaft 324 and worm 312 in a clockwise or counterclockwise direction around shaft axis 326.

In some examples, actuator 320 may be configured to slide linearly along shaft axis 326. As such, motor 322, shaft 324, and worm 312 may have positions that are fixed relative to each other, but configured such that they slide as a group along shaft axis 326 in response to one or more forces.

In some examples, actuator 320 may be mounted on a housing 328 such that actuator 320 and housing 328 are configured to slide together along shaft axis 326. One or more components of actuator 320 may be glued, screwed, or otherwise affixed to housing 328. Housing 328 in turn may be coupled to plate 360 via a sliding coupling or other low friction coupling. As such, housing 328 may be free to slide along shaft axis 326. Housing 328 may be any component that allows actuator 320 to slide along the axis. As such, housing 328 may be any shape or dimension that couples to actuator 320 to allow actuator 320 to slide along shaft axis 326, and may be a plastic, metal, composite, or other material.

Device 300 may also include a first spring 330, and a second spring 340. First spring 330 may have two ends, with a first end 331 coupled to actuator 320 and a second end 332 fixed. Second spring 340 may have a first end 341 coupled to actuator 320 and a second end 342 fixed. In FIG. 3A, the first ends of the first spring (331) and second spring (341) are coupled to actuator 320 via the housing 328. However, in some examples, the first ends of the first spring (331) and first end of the second spring (341) may be coupled directly to the motor 322 without the housing 328. The first ends may be coupled to actuator 320 in other arrangements as well. Also in FIG. 3A, the second ends of the first spring (332) and second spring (342) are fixed to plate 360. As such, the fixed nature of the second ends of the first spring and second spring is such that the second ends of the springs do not move with respect to plate 360 and/or central point 316 of worm gear 314. Put another way, the second ends of the first and second springs may be fixed relative to the arm in which device 300 is housed.

Figure 3B:
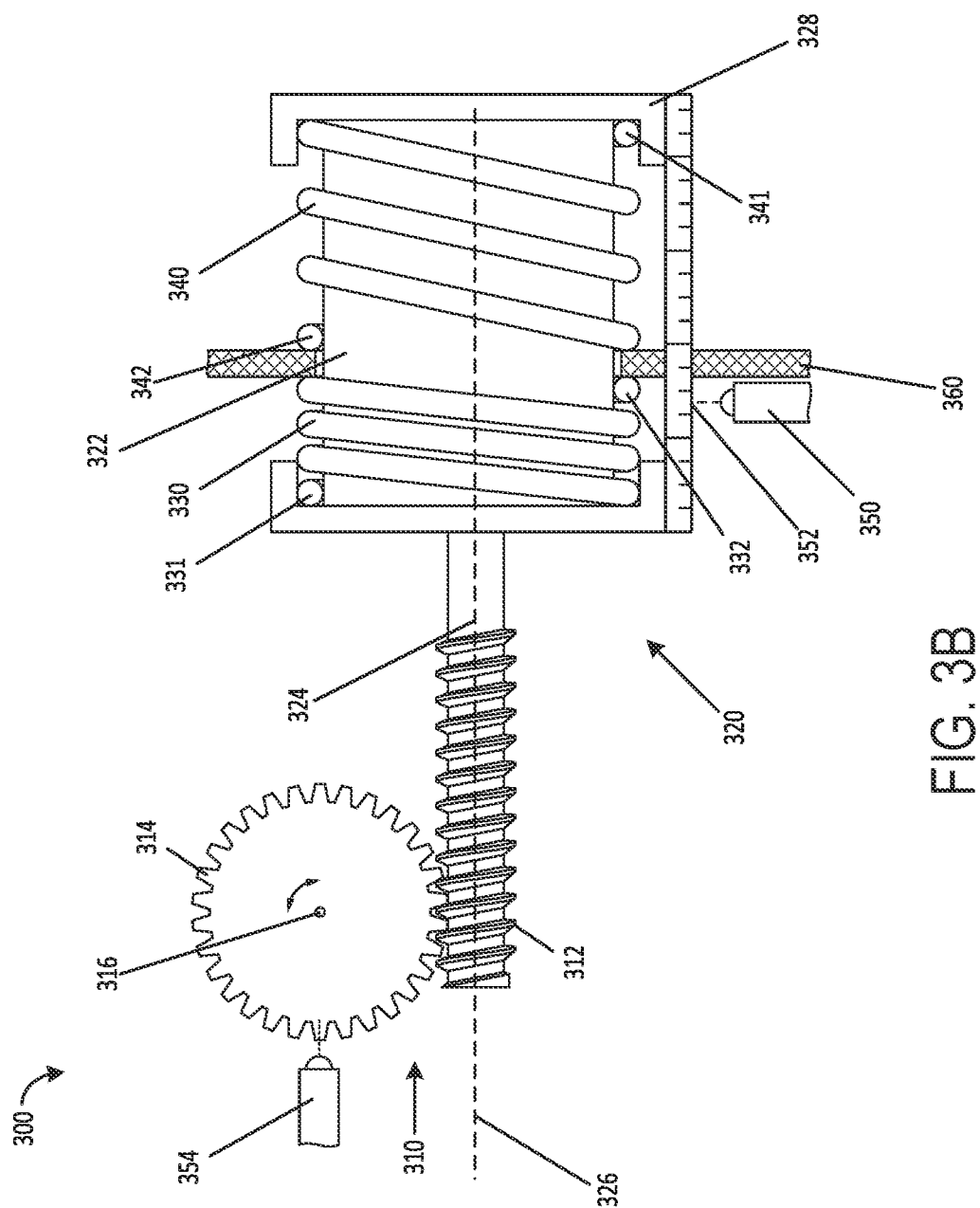
FIG. 3B illustrates the first configuration of the device of FIG. 3A in a second state, according to an example implementation.

In some examples, first spring 330 and second spring 340 may be configured to resist movement of the actuator along respective directions of the shaft axis 326. For instance, as arranged in FIG. 3A, first spring 330 is configured to resist movement of actuator to the right by compressing, and second spring 340 is configured to resist movement of the actuator to the left by compressing. Each spring may also resist movement in the opposition direction by extending. The combination of the first and second springs being configured to compress when the actuator moves in opposite directions may provide stability. As arranged in FIG. 3A, movement of actuator 320 linearly to the right along shaft axis 326 may cause first spring 330 to compress, while causing second spring 340 to extend. This situation is shown in FIG. 3B. When actuator 320 is in a first position as shown in FIG. 3A, the system comprising first spring 330 and second spring 340 may be at equilibrium. Equilibrium in this sense means that the forces acting on the system are balanced, such that an added force is required to compress or extend the springs in the system. When actuator 320 slides to a second position (due to one or more forces or torques transmitted through the worm drive), first spring 330 may be compressed while second spring 340 may be extended. In this state, shown in FIG. 3B, first spring 330 may impart a responsive force on actuator 320 in an attempt to return the system to the first position.

In some examples, the first spring 330 and/or second spring 340 may surround portions of actuator 320, such as those shown in FIGS. 3A and 3B. More or less of actuator 320 may be surrounded by the springs than shown in FIG. 3A. Arranging first spring 330 and second spring 340 around actuator 320 can result in a more compact design, allowing device 300 to be smaller and thus appropriate for more uses and applications. First spring 330 and second spring 340 may have the same or similar spring constants, or may have different spring constants. In some examples, the spring constants of first spring 330 and second spring 340 may be selected such that the actuator is biased toward movement in either a first direction or a second direction along the shaft axis. This may be particularly useful where there is an inherent bias in a particular direction, which may be due to the orientation or expected forces acting on a robotic component that makes use of device 300. For instance, where device 300 is used in a robotic leg, an upright orientation of the device may be such that gravity is expected to bias the actuator to move in a particular direction. The spring constants of the first and second springs may be chosen such that the effect of gravity is taken into account, and one spring has a higher spring constant than the other.

In some examples, the first end of each spring may be unattached or disconnected from the actuator. Each spring may be fixed on one end, but unconnected on the other end. In these examples, movement of the actuator in a first direction may cause the first end of the first spring to contact the actuator, and may cause the first spring to compress. The first end of the second spring, however, may not contact the actuator, and may remain unextended. As such, movement of the actuator in a first direction may cause compression (or extension) of a first spring, while the second spring remains unextended (or uncompressed). Each spring may thus act only to resist movement of the actuator in a single direction, while not preventing or affecting movement of the actuator in a second, opposite, direction.

Each spring may have one or more characteristics in addition to spring constant that may vary, such as size, firmness, and/or material. Each of these characteristics may be altered based on the particular application of the robotic gripping device. For example, a spring with a higher spring constant may require more force to compress or extend, which may be used to determine the appropriate spring to use for a particular application.

In some examples, device 300 may also include one or more encoders, sensors, or detectors configured to detect the rotation, position, movement, and/or forces acting on one or more parts of the device. For example, device 300 may include linear position encoder 350, which may be positioned on or coupled to the plate 360. Linear position encoder 350 may be configured to detect the position and movement of actuator 320 along shaft axis 326, and may provide information about the extent or amount of movement to a control system. Linear position encoder 350 may be positioned anywhere on or near device 300 such that it can detect movement of actuator 320 along shaft axis 326. In some examples, linear position encoder 350 may detect the movement of actuator 320 with respect to plate 360 (i.e., a fixed component). In other examples, linear position encoder 350 may detect movement of actuator 320 with respect to past positions of actuator 320. As such, both relative and absolute amounts of movement of actuator 320 may be detected. Further, robotic gripping device 500 may include a rotational position encoder 354 configured to detect and/or determine the rotational position of worm gear 314. The rotational position encoder may also be configured to detect absolute and/or relative rotation of worm gear 314.

In some examples, the linear encoder and/or rotational encoder may be mechanical, optical, magnetic, capacitive, glass scale, or another type of encoder. In addition, the encoders may be absolute or may be incremental. Further, the linear position encoder 350 may be a potentiometer. The potentiometer may be configured to detect a position of actuator 320 relative to the plate 360, and provide an output that may be received by a control system. The potentiometer may also detect a relative movement of actuator 320.

As mentioned earlier, actuator 320 may be configured to slide along shaft axis 326, and linear position encoder 350 may be configured to determine the position of actuator 320. In FIG. 3A, device 300 may be in a first state in which linear position encoder 350 may determine the first position 351 of actuator 320. FIG. 3B shows device 300 in a second state in which the actuator has moved to the right along shaft axis 326. In FIG. 3B, linear position encoder 350 may determine the second position 352 of actuator 320. The difference between first position 351 and second position 352 may be used to determine the force acting on actuator 320 causing it to slide.

Figure 4A:
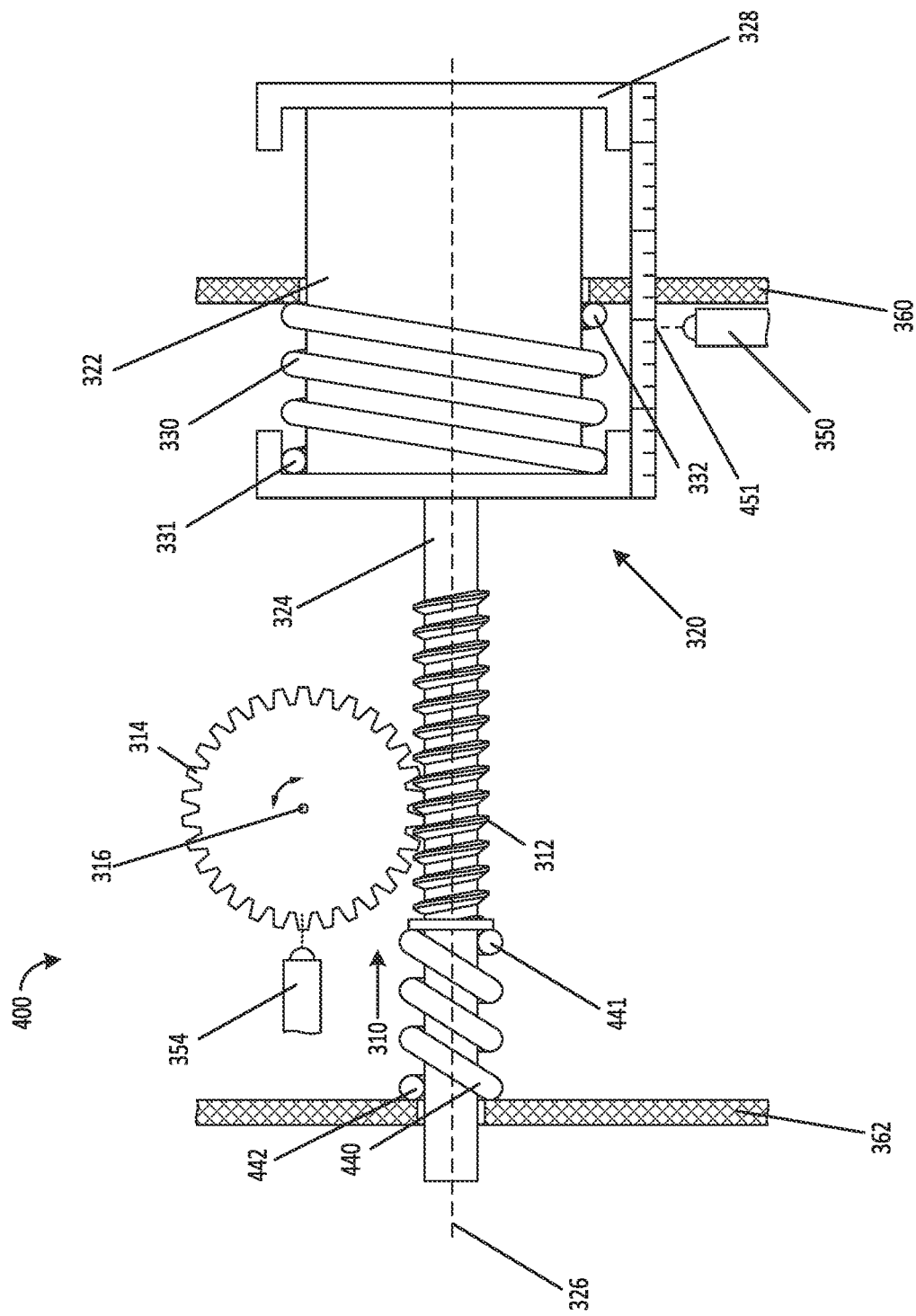
FIG. 4A illustrates a second configuration of a device in an initial state, according to an example implementation.
Figure 4B:
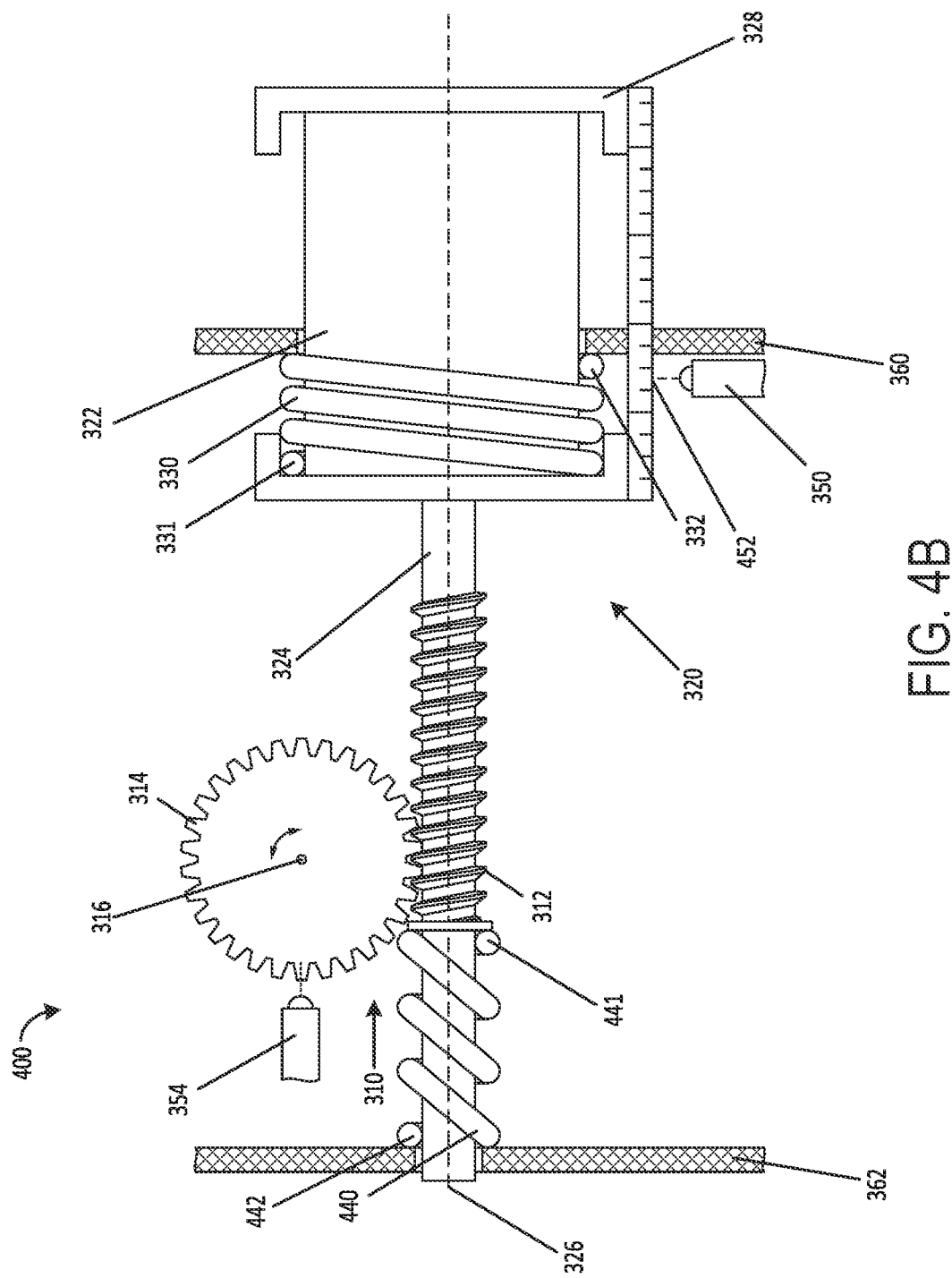
FIG. 4B illustrates the second configuration of the device of FIG. 4A in a second state, according to an example implementation.

In some examples, different spring types and orientations may be used. For instance, FIGS. 4A and 4B illustrate a first state and a second state of an example embodiment of a device 400. Device 400 may be similar or identical to device 300 in one or more respects. For instance, device 400 may include the same first spring 330 as device 300. But device 400 may include a different second spring 440 than device 300. As shown in FIG. 4A, second spring 440 may be positioned on shaft 324 of device 400. The first end 441 of second spring 440 may be coupled to shaft 324. And the second end 442 of second spring 440 may be fixed, such as to plate 362. Plate 362 may be fixed relative to plate 360 and/or central point 316 of worm gear 314. In FIG. 4A, device 400 is shown in a first state in which linear position encoder 350 may determine the first position 451 of actuator 320.

FIG. 4B illustrates the same device 400 in a second state, in which actuator 320 has moved to the right along shaft axis 326. FIG. 4B shows that first spring 330 has been compressed, while second spring 440 has been extended. Second spring 440 may be similar to second spring 340, in that each may be configured to resist movement of the actuator in a particular direction along shaft axis 326. In FIG. 4B, device 400 is shown in the second state in which linear position encoder 350 may determine the second position 452 of actuator 320. The difference between first position 451 and second position 452 may be used to determine a force acting on actuator 320.

Figure 5A:
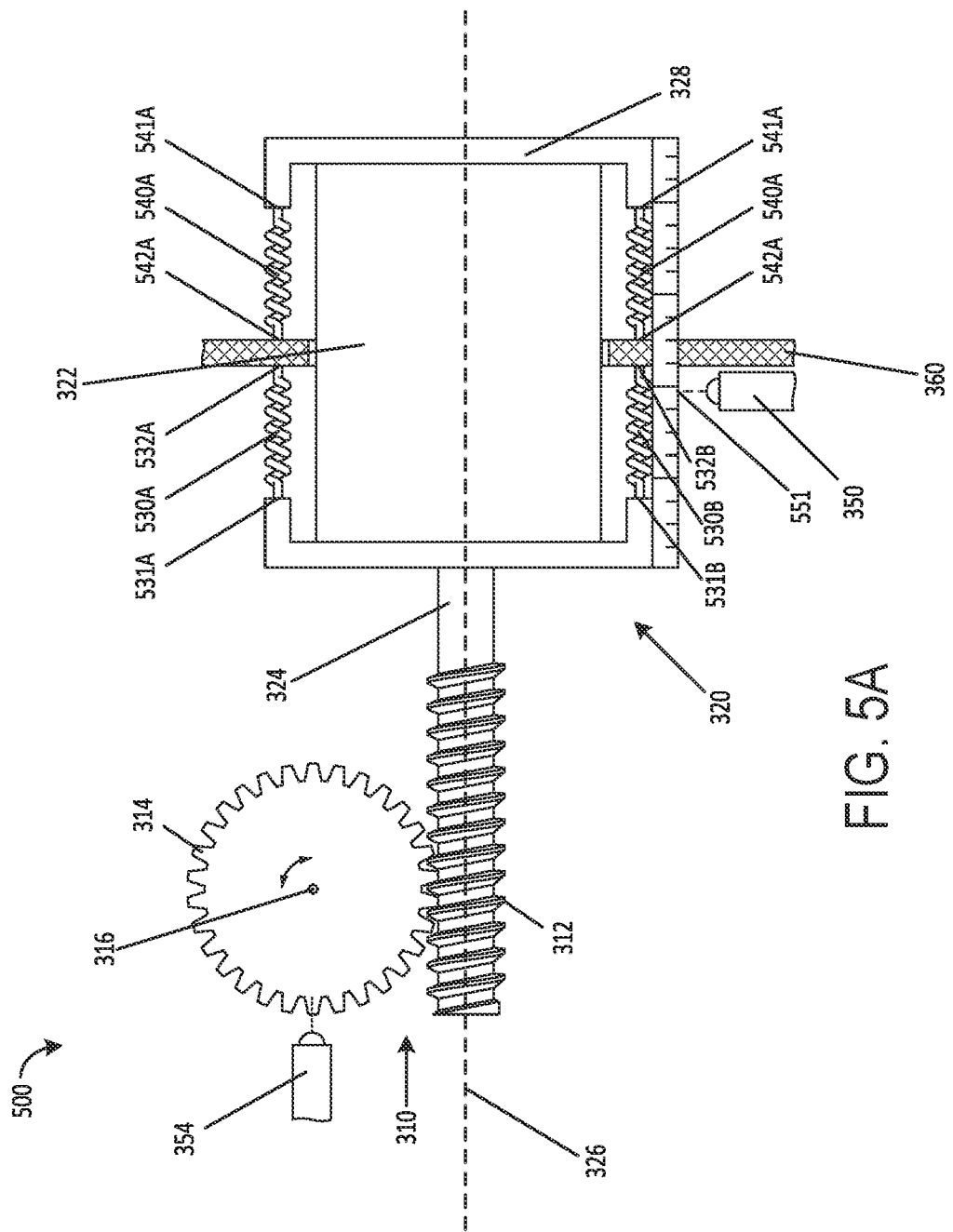
FIG. 5A illustrates a third configuration of a device in an initial state, according to an example implementation.
Figure 5B:
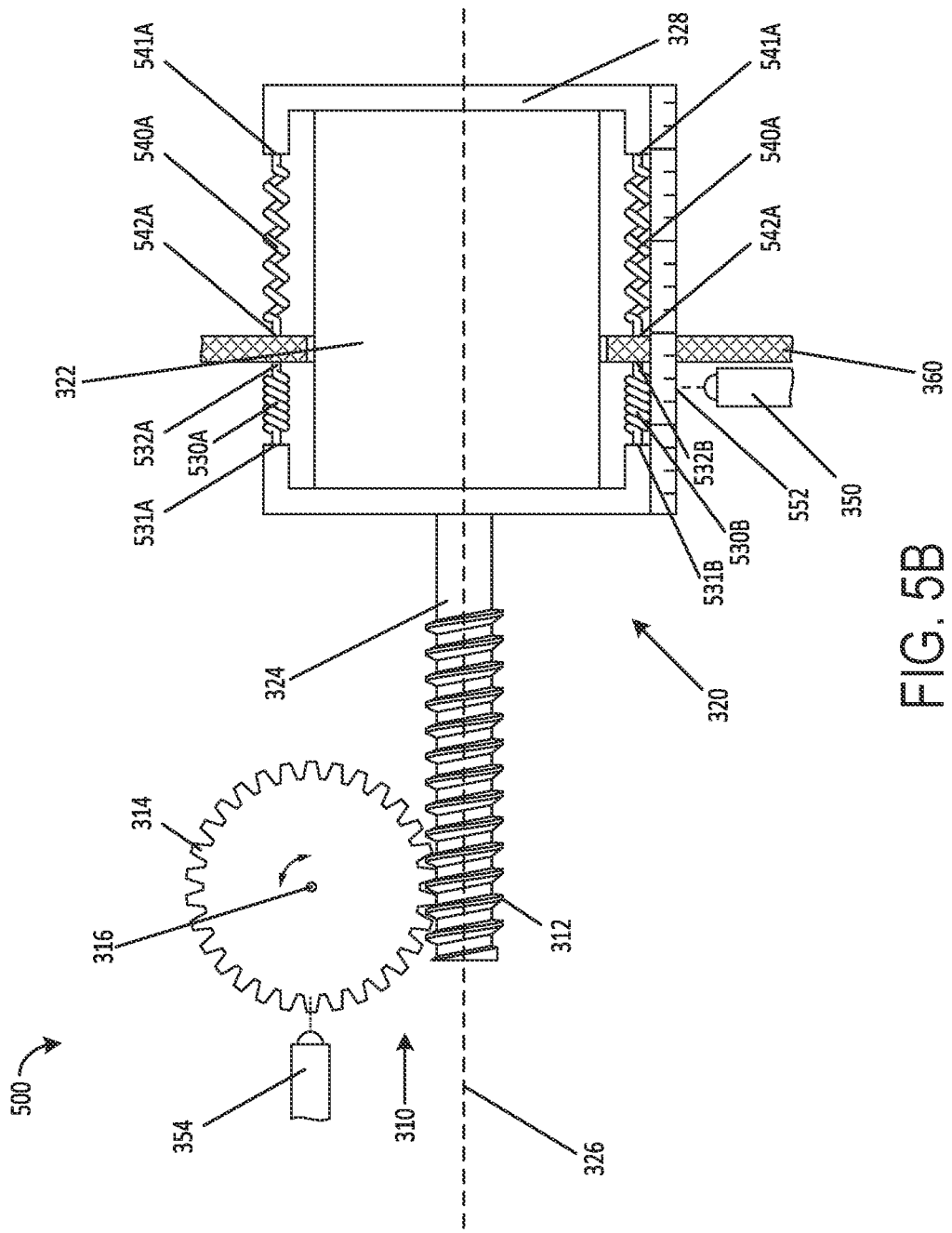
FIG. 5B illustrates the third configuration of the device of FIG. 5A in a second state, according to an example implementation.

FIGS. 5A and 5B illustrate a first state and a second state of a device 500 having a third orientation of first and second springs. Device 500 may be similar or identical in some respects to devices 300 and 400 described above. But in FIG. 5A, first spring 330 and second spring 340 (or 440) have been replaced by first springs 530A and 530B and second springs 540A and 540B. Each of the springs 530A-B and 540A-B may be extension springs, and may be configured to resist movement of actuator 320 along the shaft axis 326. The first ends (531A-B and 541A-B) may be coupled to actuator 320, such as via housing 328, while the second ends (532A-B and 542A-B) may be fixed, such as to plate 360. When actuator 320 slides along shaft axis 326 in response to a force, first springs 530A-B may compress while second springs 540A-B extend. This is shown in FIG. 5B.

In FIG. 5A, device 500 is shown in a first state in which linear position encoder 350 may determine the first position 551 of actuator 320. In FIG. 5B, device 500 is shown in the second state in which linear position encoder 350 may determine the second position 552 of actuator 320. The difference between first position 551 and second position 552 may be used to determine a force acting on actuator 320.

Devices 300, 400, and 500 may also each include a control system such as control system 118 in FIG. 1, which may control one or more aspects of each device. The control system may include one or more processors, and may also include a non-transitory computer-readable memory, which may have stored thereon instructions executable by the one or more processors to carry out one or more actions described in this disclosure.

In some examples, the control system may receive, from linear position encoder 350, the position of actuator 320 along shaft axis 326. The control system may receive a continuous feed of information from linear position encoder 350, or it may receive information at discrete time intervals. The received position may also be an absolute position, or it may be a relative position. For instance, the linear position encoder may provide a change in position from a first point in time to a second point in time, between which actuator 320 has moved along shaft axis 326. The control system may then determine the amount of force transmitted through the worm drive based on the position of actuator 320. The determined amount of force may be the amount of force acting on the shaft, from the worm gear 314, along the shaft axis.

In some examples, the control system may also be configured to control device 300, 400, and/or 500 based on the determined force. The determined force may indicate that an object in the environment is interacting with some portion of a robotic device of which device 300, 400, or 500 is a part. There may be a threshold force, above which the control system may want to protect one or more components of the device. This may occur if a robotic device falls over, runs into an object, or is impacted by an object in the environment. In these instances, it may be beneficial for the control system to act to prevent damage. For instance, when the determined force is greater than a threshold force, the control system may control the actuator by changing the speed of rotation of the shaft. This may include turning the motor off, which may cause the shaft to cease rotation and may prevent damage. In other examples, when the determined force is greater than a threshold force, the control system may control the motor to cause the shaft to begin rotation or change the direction of rotation. This may cause the arm or other component to move out of the way or to lessen the force imparted on the device. Other examples are possible as well.

IV. Example Operations

Figure 6:
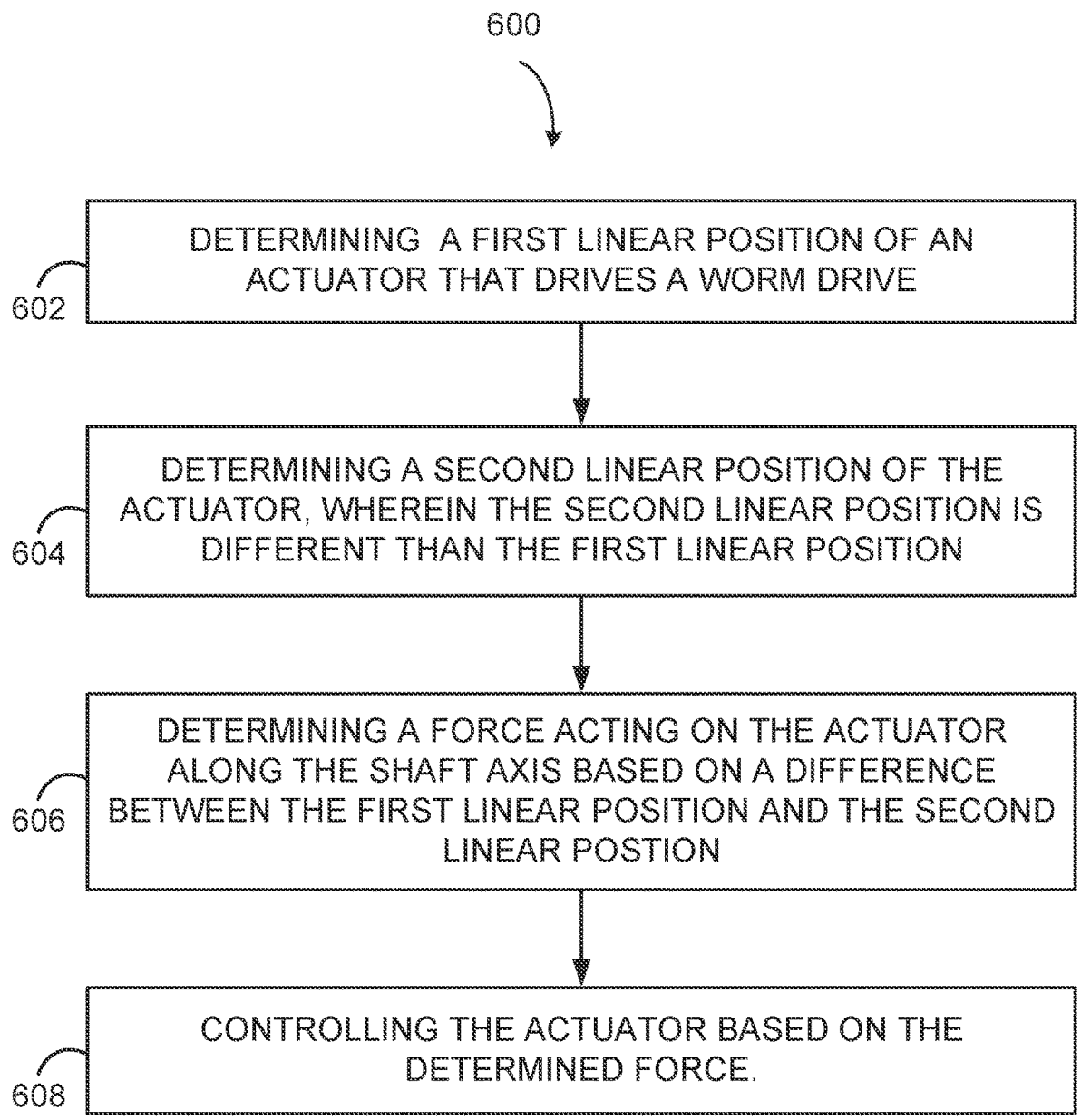
FIG. 6 illustrates a flowchart of an example method according to an example implementation.

FIG. 6 illustrates a flowchart of an example method 600. This example method may apply to devices 300, 400, and/or 500. Method 600 may also apply to other devices having different arrangements and/or different components than those described herein. Further, method 600 may be carried out by one or more control systems of the robotic system 100 and/or robotic arm 200, as well as a control system of a robotic device including device 300, 400, and/or 500.

At block 602, method 600 may include determining a first linear position of an actuator that drives a worm drive. In some examples, this may be carried out on a device such as device 300, 400, and/or 500, which includes a worm drive, actuator, first spring, second spring, and linear position encoder. Determining the first linear position may include the linear position encoder detecting the first position, and transmitting the information to a control system. In some examples, determining the first linear position may include a control system receiving data from the linear position encoder, and then determining an absolute or relative position based on the received data.

At block 604, method 600 may include determining a second linear position of the actuator, wherein the second linear position is different than the first linear position. Determining the second linear position may be carried out in a manner similar or identical to block 602 in which the first linear position is determined. After the first position is determined, a force may act on the actuator causing the actuator to slide along the shaft axis to a second position. In the second position, only one of the first and second spring may be compressed when in the second position. For instance, the first spring may be compressed while the second spring is extended, or vice versa.

In some examples, the force may come from an external source, such as an object in the environment. The object may impart a force on the worm gear, causing the worm gear to rotate and slide the actuator along the shaft axis (via a coupling with the worm of the actuator). In other examples, the force may come from the motor attempting to drive the worm drive. The motor may actuate and thereby cause the shaft and worm to rotate. In the event that the worm gear is prevented from rotating freely, the worm may be driven along the shaft axis by rotating against the stationary (or semi-stationary) worm gear. In this manner, the motor may cause the actuator to slide along the shaft axis to a second position.

At block 606, method 600 may include determining a force acting on the actuator along the shaft axis based on a difference between the first linear position and the second linear position. In some examples, the force may be determined based on the difference in position as well as the characteristics of the first and second spring. For instance, the force causing the actuator to slide may be directly proportional to the difference in position multiplied by the spring constants of the first and second spring. Other relationships between the difference in position and force are possible as well.

At block 608, method 600 may include controlling the actuator based on the determined force. The determined force may be compared to a threshold force to determine what action to take. The threshold force may correspond to a force required to damage one or more components of the device, and may be set sufficiently below the amount required for damage. Other threshold amounts may be used as well.

In some examples, controlling the actuator may include shutting off the motor, turning it on, and/or changing the speed of rotation or direction of rotation of the shaft relative to the motor. Where the force on the actuator is above a threshold, the actuator may be controlled to counteract the force by rotating such that the actuator moves in the opposite direction to lessen the force. Put another way, if the second position of the actuator is beyond a set distance from the first position, the actuator may be controlled such that the shaft and worm rotate to cause the actuator to slide in the opposite direction to lessen the distance.

As a real world example, a device such as device 300 may be located within an arm of a robotic device to drive the elbow joint. When the elbow is partially bent, an object may be placed on the forearm. If the object is heavy, it may cause the elbow joint to feel a large force attempting to open it. This force may be transmitted through the elbow joint to the worm gear, resulting in a force causing the actuator to slide. Where the object is heavy enough to cause a force greater than a set threshold on the elbow joint, the actuator may be controlled such that it force the elbow to open (as opposed to remaining stationary). While the object may be dropped by the robotic device, the elbow joint and other components of the robotic device may avoid damage.

V. Example Variations

Some examples described above may include a rotational position encoder 354. The rotational position encoder may determine a relative or absolute rotational position of the worm gear 314. This information may be used by a control system for one or more purposes. For instance, the rotational position of worm gear 314 may correspond to the position of one or more limbs, fingers, arms, or other components of a robotic device driven by worm drive 310. The positional information may be used to avoid damage, and/or to provide the control system with a fuller picture of the position and orientation of the components of the robotic device it controls.

As described above, the force acting on the actuator that causes it to slide or move from a first position to a second position may come from an external source or from the actuator itself. In some examples, the steps of method 600 and/or the forces determined to be acting on the actuator may be determined while the motor is turned off (i.e., not rotating the shaft). But in other examples, the force may be determined while the motor is running and rotating or attempting to rotate the shaft. In these examples, the first linear position and/or second linear position of the actuator may be determined while the shaft is rotating. So too the force acting on the actuator may be determined while the shaft is rotating. As a result, controlling the actuator in response to the determined force may include changing the speed or direction of rotation of the shaft.

In some examples, the first spring and second spring may be a single spring configured to resist movement in two directions. Whereas some embodiments described above may include the first spring and/or second spring resisting movement in one direction, a single spring may replace or be used instead, and may be configured to operate or carry out the functions of both the first and second spring. For instance, the single spring may be configured to compress in one direction and extend in another direction, in line with the shaft axis, such that movement of the actuator along the shaft axis in either direction is resisted by the single spring.

VII. Conclusion

It should be understood that arrangements described herein are for purposes of example only. As such, those skilled in the art will appreciate that other arrangements and other elements (e.g. machines, interfaces, operations, orders, and groupings of operations, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and implementations have been disclosed herein, other aspects and implementations will be apparent to those skilled in the art. The various aspects and implementations disclosed herein are for purposes of illustration and are not intended to be limiting, with the true scope being indicated by the following claims, along with the full scope of equivalents to which such claims are entitled. It is also to be understood that the terminology used herein is for the purpose of describing particular implementations only, and is not intended to be limiting.

The invention claimed is:

1. A system, comprising:
a worm drive comprising a worm and a worm gear;
an actuator comprising a motor, a shaft, and the worm, wherein the shaft is configured to rotate about a shaft axis and the actuator is configured to move linearly along a shaft axis;
at least one spring is configured to resist movement of the actuator along the shaft axis; a linear position encoder configured to:
determine a first linear position of the actuator that drives the worm drive;
determine a second linear position of the actuator, wherein the second linear position is different than the first linear position; and
a control system configured to:
determine a force acting on the actuator along the shaft axis based on a difference between the first linear position and the second linear position; and
control the actuator based on the determined force.

2. The system of claim 1, wherein the at least one spring is configured to resist movement of the actuator along the shaft axis as a result of a force transmitted through the worm drive in a first direction by compressing, and in a second direction by extending.

3. The system of claim 1, wherein the at least one spring is a first spring and a second spring, wherein the first spring has a first end and a second end, wherein the second end of the first spring is fixed, and wherein the first spring is configured to resist movement of the actuator along the shaft axis in a first direction as a result of a first force transmitted through the worm drive, and wherein the second spring has a first end and a second end, wherein the second end of the second spring is fixed, and wherein the second spring is configured to resist movement of the actuator along the shaft axis in a second direction as a result of a second force transmitted through the worm drive, wherein the second direction is opposite the first direction.

4. The system of claim 3, wherein the first end of the first spring and the first end of the second spring are coupled to the actuator, the second end of the first spring and the second end of the second spring are anchored in fixed positions relative to the worm gear, and wherein the first spring and the second spring surround respective portions of the motor.

5. The system of claim 3, wherein the first end of the first spring is coupled to the motor, the first end of the second spring is coupled to the shaft, and the second end of the first spring and the second end of the second spring are anchored in fixed positions relative to the worm gear.

6. The system of claim 3, wherein the first spring and the second spring are extension springs, the first end of the first spring and the first end of the second spring are coupled to the motor, and the second end of the first spring and the second end of the second spring are anchored in fixed positions relative to the worm gear.

7. The system of claim 3, wherein the first end of the first spring and the first end of the second spring are uncoupled from the actuator, and the second end of the first spring and the second end of the second spring are anchored in fixed positions relative to the worm gear.

8. The system of claim 1, wherein the linear position encoder is configured to determine the second linear position of the actuator while the shaft is rotating.

9. The system of claim 1, wherein the control system is configured to:
determine that the force acting on the actuator is above a threshold force; and
responsive to the determination that the force acting on the actuator is above the threshold force, change a speed of rotation of the shaft.

10. The system of claim 1, wherein the control system is configured to:
determine that the force acting on the actuator is above a threshold force; and
responsive to the determination that the force acting on the worm drive is above the threshold force, initiating rotation of the shaft relative to the motor.

11. A system, comprising:
a worm drive comprising a worm and a worm gear;
an actuator comprising a motor, a shaft, and the worm, wherein the shaft is configured to rotate about a shaft axis and the actuator is configured to move linearly along a shaft axis;
a first spring having a first end and a second end, wherein the second end of the first spring is fixed, and wherein the first spring is configured to resist movement of the actuator along the shaft axis in a first direction as a result of a first force transmitted through the worm drive;
a second spring having a first end and a second end, wherein the second end of the second spring is fixed, and wherein the second spring is configured to resist movement of the actuator along the shaft axis in a second direction as a result of a second force transmitted through the worm drive, wherein the second direction is opposite the first direction;

a linear position encoder configured to:
determine a first linear position of the actuator that drives the worm drive;
determine a second linear position of the actuator, wherein the second linear position is different than the first linear position; and
a control system configured to:
determine a force acting on the actuator along the shaft axis based on a difference between the first linear position and the second linear position; and
control the actuator based on the determined force.

12. The system of claim 11, wherein the first end of the first spring and the first end of the second spring are coupled to the actuator, the second end of the first spring and the second end of the second spring are anchored in fixed positions relative to the worm gear, and wherein the first spring and the second spring surround respective portions of the motor.

13. The system of claim 11, wherein the first end of the first spring is coupled to the motor, the first end of the second spring is coupled to the shaft, and the second end of the first spring and the second end of the second spring are anchored in fixed positions relative to the worm gear.

14. The system of claim 11, wherein the first spring and the second spring are extension springs, the first end of the first spring and the first end of the second spring are coupled to the motor, and the second end of the first spring and the second end of the second spring are anchored in fixed positions relative to the worm gear.

15. The system of claim 11, wherein the first end of the first spring and the first end of the second spring are uncoupled from the actuator, and the second end of the first spring and the second end of the second spring are anchored in fixed positions relative to the worm gear.

16. The system of claim 11, wherein the first spring and the second spring comprise a single spring, and wherein the single spring is configured to resist movement of the actuator along the shaft axis as a result of a force transmitted through the worm drive in a first direction by compressing, and in a second direction by extending.

17. The system of claim 11, further comprising a robotic joint having one degree of freedom, wherein the worm drive is configured to drive the robotic joint.

18. The system of claim 11, wherein a first spring constant corresponding to the first spring is equal to a second spring constant corresponding to the second spring.

19. A device comprising:
a worm drive comprising a worm and a worm gear;
an actuator comprising a motor, a shaft, and the worm, wherein the shaft is configured to rotate about a shaft axis and the actuator is configured to move linearly along a shaft axis;
a first spring having a first end and a second end, wherein the second end of the first spring is fixed, and wherein the first spring is configured to resist movement of the actuator along the shaft axis in a first direction as a result of a first force transmitted through the worm drive;
a second spring having a first end and a second end, wherein the second end of the second spring is fixed, and wherein the second spring is configured to resist movement of the actuator along the shaft axis in a second direction as a result of a second force transmitted through the worm drive, wherein the second direction is opposite the first direction; and
a linear position encoder configured to:

determine a first linear position of the actuator that drives the worm drive; and determine a second linear position of the actuator, wherein the second linear position is different than the first linear position.

20. The device of claim 19, further comprising a sensor that determines a force acting on the actuator along the shaft axis based on a difference between the first linear position and the second linear position.

* * * * *